3,499,795
STORAGE BATTERY HAVING ELECTRODES
COMPRISING A SUPPORTING BASE OF
TITANIUM NITRIDE
Samuel Ruben, 52 Seacord Road,
New Rochelle, N.Y. 10804
No Drawing. Filed Apr. 8, 1968, Ser. No. 719,725
Int. Cl. H01m 43/04, 39/00
U.S. Cl. 136—24                                    2 Claims

ABSTRACT OF THE DISCLOSURE

The invention is an electrode for rechargeable batteries comprising a sintered porous titanium nitride body impregnated with an electrochemically reversible material.

The invention relates to electrodes for rechargeable batteries and employs a sintered porous structure comprising titanium nitride impregnated with reactants suitable for the specific type of battery.

In air space telemetric operations, the weight of the power source is of fundamental importance. In the two types of batteries available, such as the acid type using lead peroxide as the cathode or the alkaline type using nickel hydroxide, the weight of the supporting grids which hold the active materials constitute a large percentage of the electrode weight.

This invention relates to the use of conductive, yet chemically resistant, light weight material, titanium nitride, which has a resistivity in the order of $21.7 \times 10^{-6}$ ohm cm. as the base material for forming a sintered porous electrode. The active ingredient impregnated in the pores for the acid type batteries is lead peroxide for one electrode and lead for the other. In the alkaline cell the cathode comprises nickel hydroxide impregnated into the porous plaque, either by electrolytic deposition or chemical precipitation, with porous cadmium or iron in the anode plaque.

The lead peroxide may be impregnated into the pores of the porous titanium nitride by anodic deposition from a saturated lead sulfamate solution. On the cathode side, utilizing a lead sulfamate electrolyte, lead is deposited on the titanium nitride base. The lead peroxide impregnated electrode may be used in a lead peroxide/lead cell with sulfuric acid electrolytes or in a sulfamic acid lead sulfamate solution.

Where the porous nitride electrode is used in an alkaline electrolyte, for example, lithium hydroxide, nickel hydroxide is preferably deposited electrolytically from a molten nickel nitrate solution, or it can be deposited by precipitation of an absorbed nickel nitrate solution with a cathodic discharge in a manner commonly used in the art. The anodes may be either cadmium or zinc impregnated in the porous nitride plaque.

The titanium nitride porous structure may be produced by reacting a sintered titanium powder plaque with nitrogen gas at a temperature of about 1200° C. The entire mass of the titanium can be reacted or just enough to ensure an integral nitride component on all of the active surfaces. The titanium nitride has a sintered hardness of about 9 mhos, and a melting point of 2950° C. The titanium nitride electrode may be formed by filling a suitable cavity with titanium granules and sintering in a nitrogen atmosphere, as mentioned above. In a practical case, an actual sieve analysis of the titanium powder has shown 0% plus 100 mesh, 8.2% minus 100 mesh plus 200 mesh, 88.8% minus 200 mesh plus 325 mesh and 30% minus 325 mesh. The Fisher number of the powder was found to be 21.0 and the Scott apparent density was 22.9 grams/in.$^3$. The pressure during sintering in the vacuum furnace ranged from 0.14 micron down to 0.06 micron during the time the titanium powder was at sintering temperature.

Although the process described avoids the necessity of compression before sintering and yields high porosity, such as 70%, porous titanium plaques can be made by conventional metallurgical procedures utilizing pressing and sintering steps. In this process, the porosity can be increased by adding a volatile binder to the titanium powder such as an alkyd resin which decomposes without leaving a carbonized mass. The sintered titanium powder plaque is then reacted in a nitrogen atmosphere to convert the titanium into titanium nitride. The electrode of this invention is inert to sulfuric acid, alkalines and other electrolytes of the art, such as sulfamic acid and may be used in all of the well-known types of rechargeable cells.

The density of the titanium nitride is only approximately 5.43 g./cm.$^3$; the density of lead is 11.34 g./cm.$^3$; the density of nickel is 8.90 g./cm.$^3$. Rechargeable batteries employing the electrode therefore have a much more favorable weight capacity ratio than the conventional types of rechargeable batteries.

What is claimed is:

1. A rechargeable battery having positive and negative electrodes, the positive electrode consisting essentially of a sintered porous base of titanium nitride, impregnated with nickel hydroxide and the negative electrode consisting essentially of a sintered porous base of titanium nitride impregnated with cadmium and an electrolyte comprising lithium hydroxide.

2. A storage battery having an electrolyte of sulfuric acid, a positive electrode consisting essentially of a supporting base of titanium nitride having a coating of lead peroxide and a negative electrode comprising lead.

References Cited
UNITED STATES PATENTS

| 2,631,115 | 3/1953 | Fox | 136—138 |
| 3,346,421 | 10/1967 | Thompson et al. | 136—120 |
| 3,380,856 | 4/1968 | Pohl | 136—120 |

WINSTON A. DOUGLAS, Primary Examiner

A. SKAPARS, Assistant Examiner

U.S. Cl. X.R.

136—26, 28